United States Patent [19]

Yazaki

[11] Patent Number: 4,483,408

[45] Date of Patent: Nov. 20, 1984

[54] TRANSAXLE FINAL DRIVE ARRANGEMENT FOR REDUCING DRIVE TORQUE REACTION TRANSMITTED TO ENGINE AND TRANSMISSION UNIT

[75] Inventor: Komei Yazaki, Atsugi, Japan

[73] Assignee: Nissan Motor Company, Limited, Yokohama, Japan

[21] Appl. No.: 427,312

[22] Filed: Sep. 29, 1982

[30] Foreign Application Priority Data

Oct. 3, 1981 [JP] Japan .................. 56-157848
Apr. 3, 1982 [JP] Japan .................. 57-55655

[51] Int. Cl.³ .................. B60B 37/00; B60K 17/24
[52] U.S. Cl. .................. 180/70.1; 74/701; 180/297
[58] Field of Search .................. 180/70.1, 71, 73.1, 180/73.2, 73.3, 254, 297; 74/404, 410, 695, 710, 713, 701, 700

[56] References Cited

U.S. PATENT DOCUMENTS

| | | | |
|---|---|---|---|
| 3,577,804 | 5/1971 | Ohno | 74/695 X |
| 3,577,805 | 5/1971 | Ohno | 74/695 X |
| 3,587,338 | 6/1971 | Henriot | 74/410 |
| 3,962,932 | 6/1976 | Okamoto et al. | 74/604 |
| 4,223,570 | 9/1980 | Yamamori et al. | 308/207 A X |
| 4,263,823 | 4/1981 | Numazawa et al. | 74/695 |
| 4,300,649 | 11/1981 | Sakata | 180/297 X |
| 4,307,628 | 12/1981 | Yamamori et al. | 74/410 X |

FOREIGN PATENT DOCUMENTS 2431299  1/1976  Fed. Rep. of Germany .
54-119125 8/1979  Japan .

Primary Examiner—Joseph F. Peters, Jr.
Assistant Examiner—Mitchell J. Hill
Attorney, Agent, or Firm—Schwartz, Jeffery, Schwaab, Mack, Blumenthal & Koch

[57] ABSTRACT

The final drive arrangement of an automotive transaxle is provided with a gearing between the differential gear and one of the driven wheels which reverses the rotation of the output of the final drive unit and then re-reverses same so that both of the driven wheels rotate in the same direction but the reaction inputted to the final drive unit from each of the driven wheels negates or offsets the other.

6 Claims, 8 Drawing Figures

TRANSAXLE FINAL DRIVE ARRANGEMENT FOR REDUCING DRIVE TORQUE REACTION TRANSMITTED TO ENGINE AND TRANSMISSION UNIT

BACKGROUND OF THE INVENTION

1. Field of the Invention

The present invention relates generally to an automotive transaxle (such as that suitable for use in an "FF" type, viz., a front engine front wheel drive, automotive vehicle) and more specifically to a final drive arrangement for such a transaxle which minimizes the engine shaking effect produced when torque is applied to the driven wheels of the vehicle.

2. Description of the Prior Art

In previously a proposed "FF-transaxle" arrangement 1 such as shown in FIGS. 1 and 2 of the drawings, a transversely mounted engine and transmission unit 2 has been mounted on the vehicle chassis vehicle through elastomeric mountings 3 and buffer rod 4. However, this arrangement has suffered from the notable drawback that upon application of torque to the wheels 5 via a final drive unit 6 and drive shafts 7, (such as during acceleration, braking etc.) a reaction is produced which is transmitted back through the final drive unit 6 to the transmission and engine unit 2 causing same to displace the unit against the bias of the engine mountings 3.

To overcome this problem the hardness of the elastomer used in the engine mountings 3 has had to be selected somewhere between that suited for vibration damping and that suited for pitching or other relatively large amplitude movements of the engine in order to maintain a suitable degree of engine vibration damping while preventing the engine and transmission from being displaced relative to the vehicle chassis. This compromise however, has not enabled the desired amount of engine vibration damping which can only be achieved through the use of elastomers softer than that possible with the prior art arrangement and has not enabled the achievement of the desired riding characteristics of the vehicle.

SUMMARY OF THE INVENTION

It is an object of the present invention to provide a final drive arrangement for an automotive vehicle transaxle which reduces or eliminates the drive torque reaction transmitted from the driven wheels to the engine thus allowing for the use of engine mountings which efficiently damp engine vibration.

The present invention features an arrangment wherein the rotation of one of the outputs of the final gear is reversed with respect to the other and then reversed before being applied to the front wheel so that the reactions inputted to the final gear unit housing from each of the front wheels negates or offsets the other.

More specifically the present invention takes the form of a transaxle having a final drive unit which includes a differential gear, first and second wheels operatively connnected with said final drive unit for being driven in the same rotational direction by first and second outputs of said final gear unit respectively and means interposed between said final drive unit and one of said first and second wheels for reversing the effect of the reaction transmitted from said wheel when torque from said final drive unit is applied thereto so as to negate the effect of the reaction simultaneously transmitted to said final gear unit from the other of said first and second wheels.

BRIEF DESCRIPTION OF THE DRAWINGS

The features and advantages of the arrangement of the present invention will become more clearly appreciated from the following description taken in conjunction with the accompanying drawings in which.

DETAILED DESCRIPTION OF THE PREFERRED EMBODIMENTS

Figure 1:
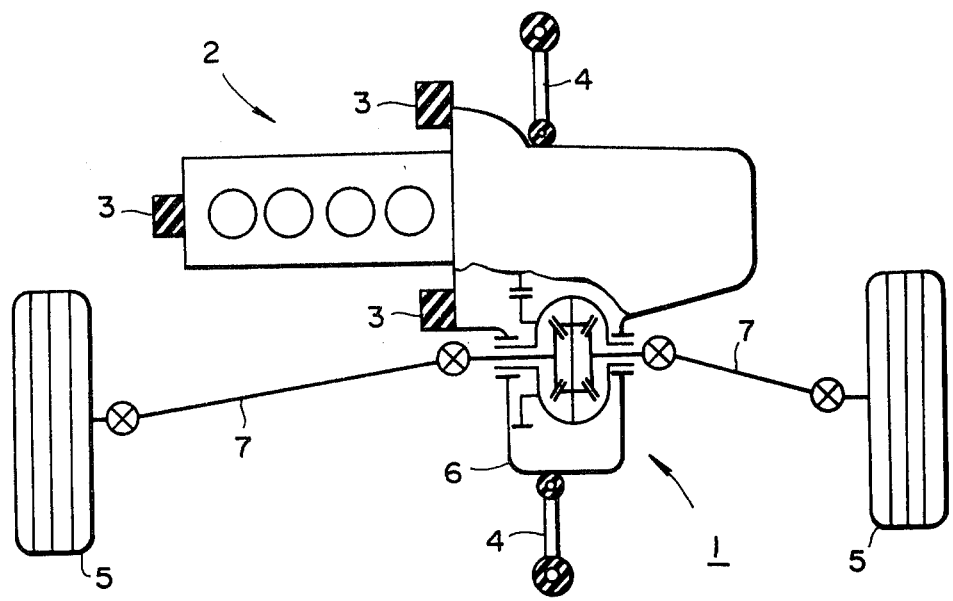
FIG. 1 is a schematic plan view of a prior art transaxle arrangement.
Figure 2:
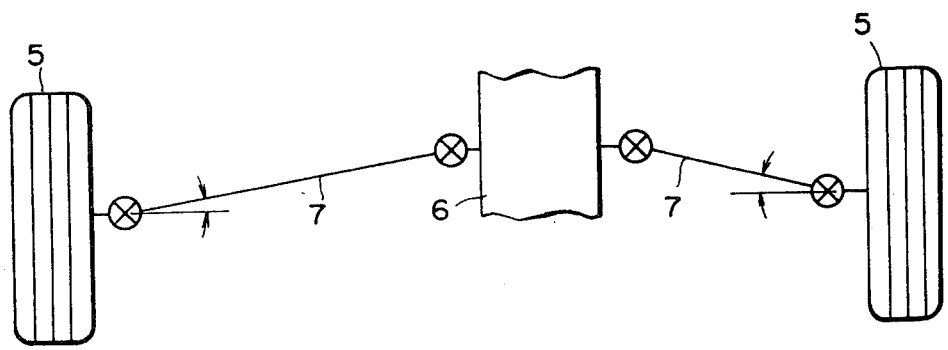
FIG. 2 is a schematic elevation of the arrangement shown in FIG. 1.
Figure 3:
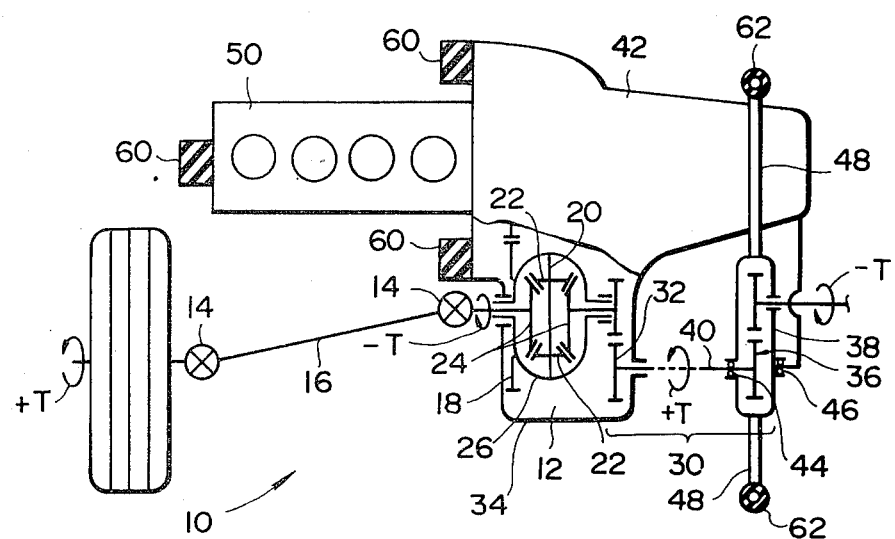
FIG. 3 is a schematic plan view of a first embodiment of the present invention.

Turning now to FIG. 3 a first embodiment of the present invention is shown in which a transaxle 10 (transversely mounted engine and transmission) has a final drive-differential gear unit 12 connected to a front left-hand wheel through universal joints 14 and drive shaft 16 in a well known manner. The final drive unit of course includes a ring gear 18, a differential pinion shaft 20, pinion gears 22, side gears 24 and a differential gear casing 26. Examples of such an arrangement may be found in U.S. Pat. No. 4,307,628 issued on Dec. 29, 1981 in the name of Yamamori et al and U.S. Pat. No. 4,223,570 issued on Sept. 23, 1980 in the name of Yamamori et al.

Interposed between the front right-hand wheel and the final drive unit is a "double reversing mechanism" 30 which defines an important part of the present invention. This so called "double reversing mechanism" takes the form a first set of reversing gears or first reversing mechanism (generally denoted by 32) which are included in the final drive unit housing 34 and a second set of reversing gears or second reversing mechanism (generally denoted by 36) and which are disposed in a housing 38 and operatively interconnected with the first set by a shaft 40. This housing 38 is arranged to be independent of the final drive unit housing 34 and rotatably supported on the transmission casing 42 through bearings 44, 46. The bearing 44 is arranged to be coaxial with the shaft 40 rendering the housing rotatable 38 about the axis thereof. The housing 38 is also connected to suitable sites on the vehicle chassis (not shown) through buffer rods 48 which hold the casing or housing 38 in a predetermined position. These rods 48 serve to prevent the tendancy for the housing 38 to rotate about the bearing under the influence of the torque transmitted thereto through the shaft and to disperse the forced applied thereto.

The operation of this arrangement is such that when the engine 50 outputs torque, which for the sake of discussion will be assumed to be 2T, and torque fed to each of the drive wheels, which induces same to rotate in a given rotational direction, is +T, the reaction produced at the front wheels and which is transmitted back toward the final drive unit housing 34 in the form of an equal and opposite torque −T (viz., a torque which tends to produce a rotation opposited that the wheels are driven to rotate in). As shown, the reaction −T from the front left-hand wheel is transmitted directly to the final drive unit housing through the drive shaft 16. However, in the case of the front right-hand wheel the torque −T is subject to a first reversal by the second set of reversal gears 36 and transmitted in the form of torque +T to the final drive unit housing 34. Thus, the final drive unit housing 34 receives torques −T and +T (viz., a torque which tends to rotate the engine/transmission in a first direction and a torque which tends to produce the reverse rotation) which cancel or negate each other.

Figure 4:
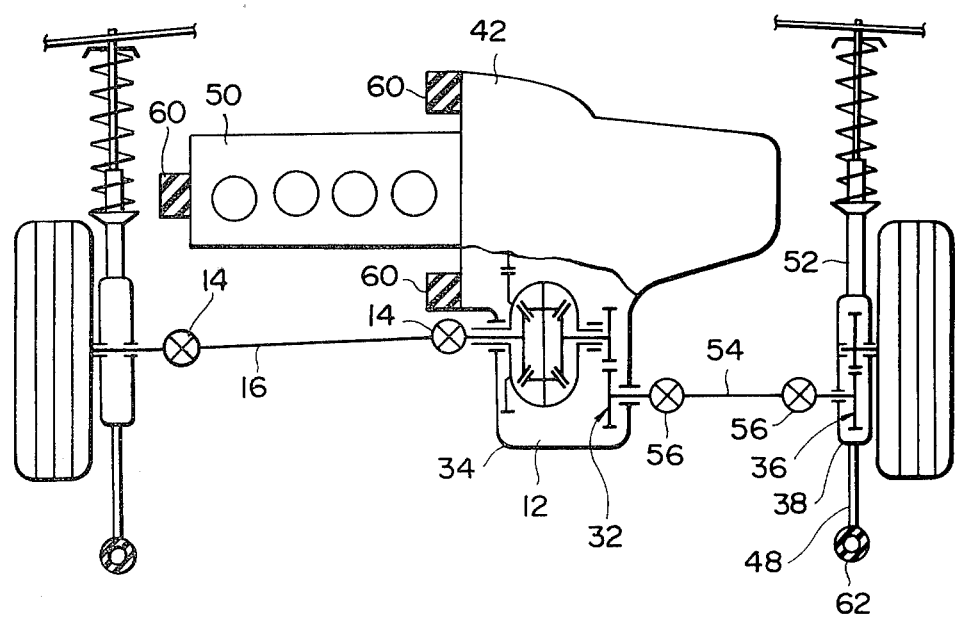
FIG. 4 is a schematic plan view of a second embodiment of the present invention.

FIG. 4 shows a second embodiment of the present invention. In this arrangement, the second set of reversing gears 36 and the housing 38 therefor is mounted on the vehicle suspension 52 so as to be movable with the wheel. Accordingly, the first and second sets of reversing gears 32, 34 are interconnected by a drive shaft 54 and universal joints 56. The buffer rod 48 is connected to a suitable member of the suspension 52 such as a suspension arm (not shown) in order to not restrict the vertical movement of the housing 38. The method of mounting the casing or housing 38 on the suspension 52 will of course vary with the type of suspension however present no problem for the skilled artisan.

Figure 5:
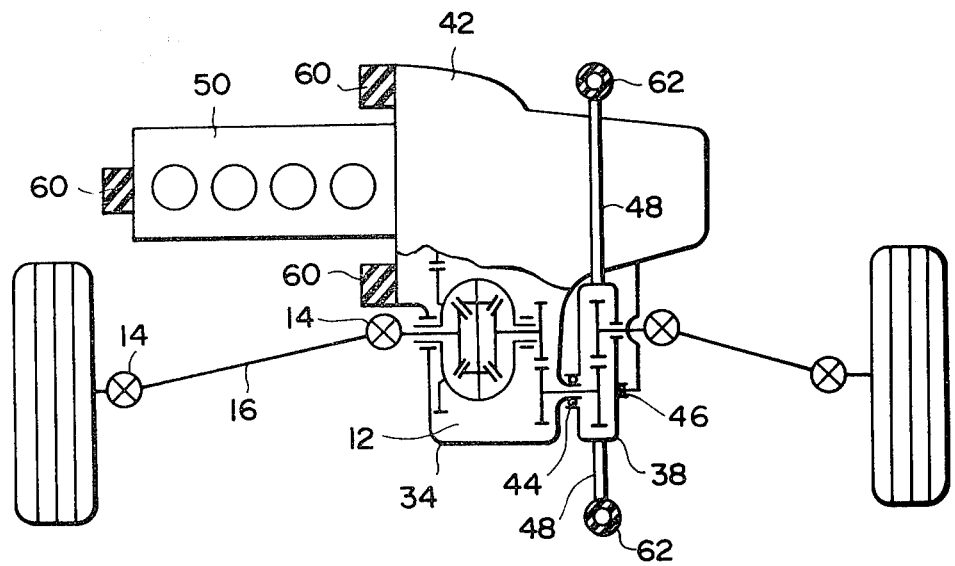
FIG. 5 is a schematic plan view of a third embodiment of the present invention.

FIG. 5 shows a third embodiment of the present invention. This arrangement is very similar to that of the first embodiment (see FIG. 3) with the exception that the housing or casing 38 is rotatably mounted on the final drive unit housing 34 through the bearing 44. "Rotatably" in this context means that rotational motion of casing 38 is not coupled or imparted to final drive unit housing 34. It will be apparent to one of ordinary skill in the art that actual rotation of casing 38 with respect to final drive unit housing 34 will be quite limited because as mentioned above, casing 38 is attached to the vehicle chassis through buffer rods 48. The arrangement shown in FIG. 5 is deemed advantageous in rendering the unit as a whole compact.

Figure 6:
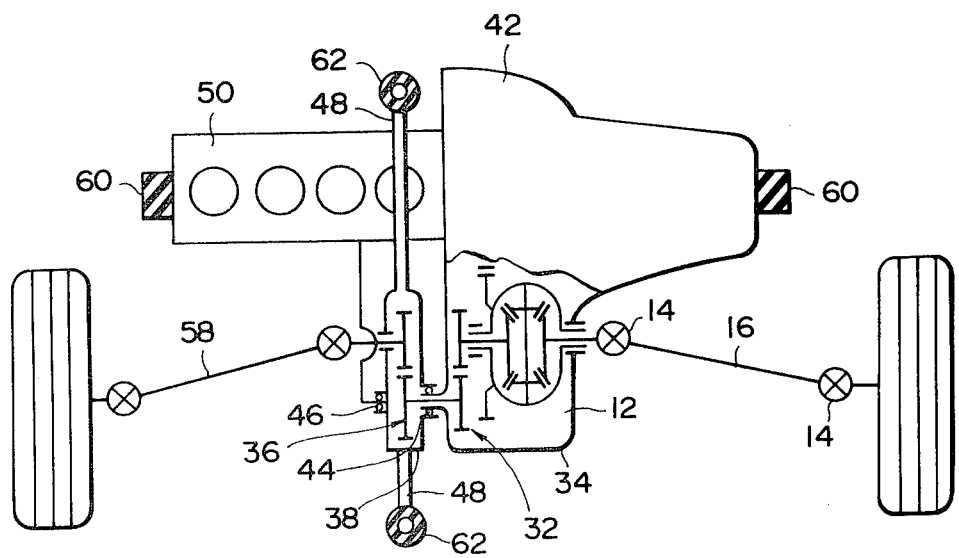
FIG. 6 is a schematic plan view of a fourth embodiment of the present invention.
Figure 7:
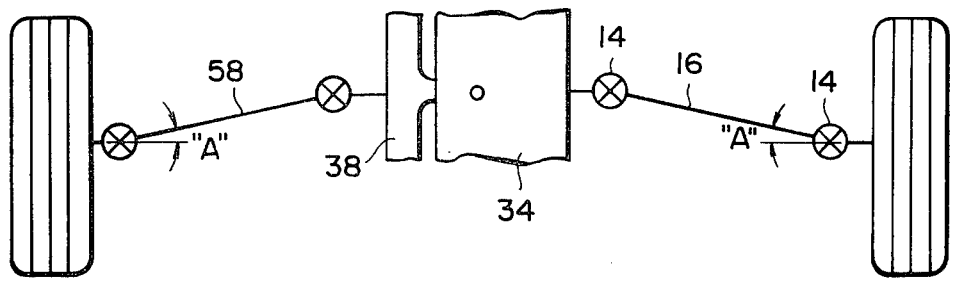
FIG. 7 is a schematic elevation of the arrangement shown in FIG. 6.

FIGS. 6 and 7 show a fourth embodiment of the present invention. In this arrangement the housing or casing 38 is disposed on the left hand side of the final drive unit housing 34 (as seen in the drawings). As will be readily appreciated, the construction is almost identical with the embodiment described in connection with FIG. 5 other than the physical location of the first and second sets of reversing gears 32, 36. However, with this embodiment, as will be best appreciated from FIG. 7, the length of the drive shafts 16, 58 may be rendered equal along with the angle "A" defined between the axis of rotation of each wheel and the associated drive shaft. This of course is highly advantageous in that it permits the alleviation of the problem produced by different length drive shafts wherein, under application of torque to the wheels, the steering wheel of the vehicle tends to rotated undesirably. In this embodiment it is possible to arranged the engine mountings 60 as shown, along the principle axis of inertia of the engine and transmission. unit.

Figure 8:
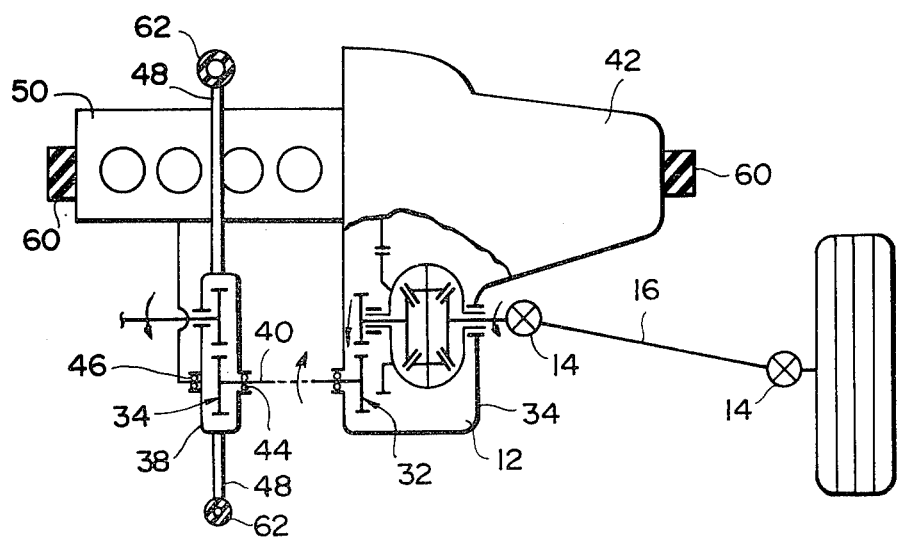
FIG. 8 is a schematic plan view of a fifth embodiment of the present invention.

FIG. 8, shows a fifth embodiment of the present invention. This embodiment is essentially the same as that disclosed in conjunction with FIG. 3, with the exception of the location of the second set of reversing gears 36 on the left hand side of the final drive unit housing 34 and an engine mounting arrangement similar to that shown in FIG. 6 is utilized.

It will be thus appreciated that with the present invention the rubber bushes 62 forming part of the buffer rods 48 can be made as hard as required to prevent large amplitude movement or vibration such as pitching or the like which the housing 38 may tend to undergo as a result of torque fluctuations induced by braking, acceleration or even road shocks which also tend to produce a momentary change in torque. Further, due to the elimination of any tendency for the engine and transmission to move under the influence of the reaction produced at the driven wheels it is possible to utilize a soft, highly vibration absorbing elastomer in the engine mountings 60.

It should also be noted that the present invention may be applied to transaxles found in FF, RR or even mid-engine type vehicles and further that the gearing utilized in the present invention is not limited to spur or helical type gears and may be replaced with planetary arrangements or the like as deemed advantageous.

What is claimed is:

1. In an automotive vehicle;
   a transaxle having a final drive unit which final drive unit includes a differential gear;
   first and second wheels operatively connected with said final drive unit for being driven in the same rotational direction by first and second outputs of said final drive unit respectively; and
   means interposed between said final drive unit and one of said first and second wheels for reversing the effect of the reaction transmitted from said one wheel to said final drive unit when torque from said final drive unit is applied to said one wheel so as to negate the effect of the reaction simultaneously transmitted to said final drive unit from the other of said first and second wheels.

2. An automotive vehicle as claimed in claim 1, wherein said final drive unit is housed in a final drive unit housing and wherein said reaction reversing means takes the form of a first mechanism for reversing the rotational direction of the output of said final drive unit and a second mechanism for reversing the output of said first mechanism, said first mechanism being mounted in said final drive unit housing and said second mechanism being mounted in a housing rotatable with respect to said final drive unit housing, said housing for said second mechanism being resiliently held in a predetermined position with respect to said final drive unit housing by buffer rods.

3. An automotive vehicle as claimed in claim 2, wherein said transaxle includes an internal combustion engine and a transmission disposed at one end of said engine, said transmission being encased in a transmission casing and wherein said second mechanism housing is disposed between said final drive unit and said first wheel so as to be adjacent said transmission casing.

4. An automotive vehicle as claimed in claim 2, wherein said transaxle includes an internal combustion engine and a transmission disposed at one end of said transmission and wherein said second mechanism housing is disposed between said final drive unit housing and said second wheel so as to be adjacent said engine.

5. An automotive vehicle as claimed in claim 2, further comprising a suspension operatively interconnecting said vehicle and said first and second wheels, and wherein said second mechanism housing is mounted on said suspension and located adjacent said one of said first and second wheels.

6. An automotive vehicle as claimed in claim 2, further comprising engine mountings for supporting said transaxle on a chassis of said vehicle, said engine mountings including relatively soft elastomeric members for damping of high frequency vibration and wherein said buffer rods include relatively hard elastomeric bushes for damping large amplitude, low frequency vibration or movement.

* * * * *